United States Patent
Song et al.

(10) Patent No.: US 12,287,813 B2
(45) Date of Patent: Apr. 29, 2025

(54) METHOD AND APPARATUS FOR DETERMINING SPATIAL RELATIONSHIP, COMPUTER DEVICE, AND STORAGE MEDIUM

(71) Applicant: JINGDONG CITY (BEIJING) DIGITS TECHNOLOGY CO.,LTD., Beijing (CN)

(72) Inventors: Li Song, Beijing (CN); Yu Zheng, Beijing (CN); Junbo Zhang, Beijing (CN); Ting Li, Beijing (CN); Junkai Sun, Beijing (CN); Hepeng Gao, Beijing (CN)

(73) Assignee: JINGDONG CITY (BEIJING) DIGITS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/281,747

(22) PCT Filed: Feb. 9, 2022

(86) PCT No.: PCT/CN2022/075658
§ 371 (c)(1),
(2) Date: Sep. 12, 2023

(87) PCT Pub. No.: WO2022/193872
PCT Pub. Date: Sep. 22, 2022

(65) Prior Publication Data
US 2024/0152532 A1    May 9, 2024

(30) Foreign Application Priority Data
Mar. 16, 2021 (CN) .......................... 202110280378.1

(51) Int. Cl.
*G06F 16/245*    (2019.01)
*G06F 16/2458*    (2019.01)
(Continued)

(52) U.S. Cl.
CPC ........ *G06F 16/288* (2019.01); *G06F 16/2458* (2019.01); *G06F 16/29* (2019.01)

(58) Field of Classification Search
None
See application file for complete search history.

(56) References Cited

U.S. PATENT DOCUMENTS

| | | | |
|---|---|---|---|
| 9,183,438 B1 | 11/2015 | Dhein | |
| 9,562,785 B1 * | 2/2017 | Racah | ...................... G06F 16/90 |

(Continued)

FOREIGN PATENT DOCUMENTS

| | | |
|---|---|---|
| CN | 110399440 A | 11/2019 |
| CN | 110909093 A | 3/2020 |
| CN | 113722409 A | 11/2021 |

*Primary Examiner* — Son T Hoang
(74) *Attorney, Agent, or Firm* — Bridgeway IP Law Group, PLLC; Jihun Kim

(57) ABSTRACT

A method for determining a spatial relationship, includes: obtaining a calculation request for the spatial relationship, the calculation request including a polygonal region and a set of report points; determining a plurality of first coded values corresponding to the polygonal region; determining a plurality of second coded values corresponding to the set of report points and a group of report points corresponding to each of the plurality of second coded values; determining a second coded value matching each of the plurality of first coded values by sorting and matching the plurality of first coded values and the plurality of second coded values respectively; and determining a relationship between the polygonal region and each report point in the set of report points according to a group of report points corresponding to the second coded value matching each of the plurality of first coded values.

16 Claims, 5 Drawing Sheets

(51) Int. Cl.
    *G06F 16/28*    (2019.01)
    *G06F 16/29*    (2019.01)

(56)    References Cited

U.S. PATENT DOCUMENTS

| | | | |
|---|---|---|---|
| 2013/0324162 A1* | 12/2013 | Fu | G06F 16/9537 |
| 2015/0181551 A1* | 6/2015 | Sonnenburg | G06F 16/24 |
| 2016/0170998 A1* | 6/2016 | Frank | G06F 16/908 |
| | | | 707/748 |
| 2020/0211370 A1* | 7/2020 | Chen | G06F 16/236 |
| 2020/0280817 A1* | 9/2020 | Clanton | G06F 16/909 |
| 2020/0349841 A1* | 11/2020 | Zerod | G06F 16/29 |

\* cited by examiner

METHOD AND APPARATUS FOR DETERMINING SPATIAL RELATIONSHIP, COMPUTER DEVICE, AND STORAGE MEDIUM

CROSS-REFERENCE TO RELATED APPLICATION

This application is the national phase of International Application No. PCT/CN2022/075658 filed on Feb. 9, 2022, which is based upon and claims priority to Chinese Patent Application No. 202110280378.1 filed on Mar. 16, 2021, the entire content of which is incorporated herein by reference.

TECHNICAL FIELD

The disclosure relates to the field of computer technologies, and in particular, to a method for determining a spatial relationship, a computer device and a storage medium.

BACKGROUND

With the popularization of the global positioning system (GPS) and mobile internet devices, application scenarios of spatial data relationships are also becoming more and more extensive. For example: querying a nearest subway station, determining a location of a nearest bus stop in a residential area, counting a number of people in a polygonal region. If a query is only for a single location, a nearest optimal solution can be found based on personal experience. However, if a spatial relationship is determined for a large amount of data, it takes a lot of time and the efficiency is relatively low.

SUMMARY

A first aspect of the disclosure provides a method for determining a spatial relationship. The method includes:
  obtaining a calculation request for the spatial relationship, the calculation request includes a polygonal region and a set of report points;
  determining a plurality of first coded values corresponding to the polygonal region according to a location relationship between each of a plurality of geographic grids and the polygonal region, in which each of the plurality of geographic grids corresponds to one coded value;
  determining a plurality of second coded values corresponding to the set of report points and a group of report points corresponding to each of the plurality of second coded values, according to a location relationship between each of the plurality of geographic grids and each of the set of report points;
  determining a second coded value matching each of the plurality of first coded values by sorting and matching the plurality of first coded values and the plurality of second coded values respectively; and
  determining a relationship between the polygonal region and each report point in the set of report points according to a group of report points corresponding to the second coded value matching each of the plurality of first coded values.

A second aspect of the disclosure provides a computer device. The device includes a memory, a processor and a computer program stored in the memory and running on the processor; when the processor executes the program, the method for determining a spatial relationship proposed in the first aspect of the disclosure is performed.

A third aspect of the disclosure provides a non-transitory computer-readable storage medium that stores a computer program, and when the computer program is executed by a processor, the method for determining a spatial relationship proposed in the first aspect of the disclosure is performed.

Additional aspects and advantages of the disclosure will be set forth, in part, from the following descriptions, and in part will be apparent from the following descriptions, or may be learned by practice of the disclosure.

BRIEF DESCRIPTION OF THE DRAWINGS

The above and/or additional aspects and advantages of the disclosure will become apparent and more readily from the following descriptions of embodiments made with reference to the accompanying drawings, in which.

DETAILED DESCRIPTION

Figure 1:
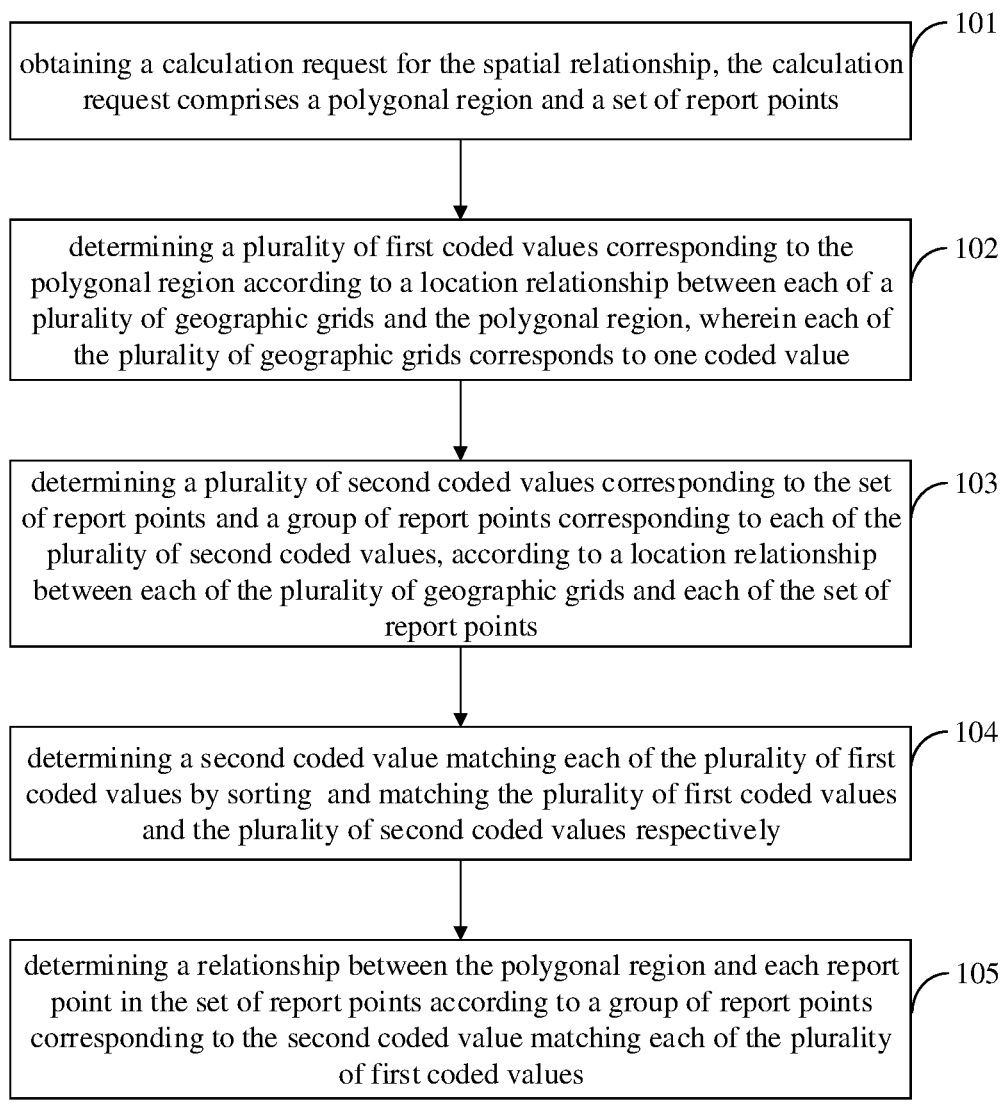
FIG. 1 is a schematic flowchart of a method for determining a spatial relationship, according to some embodiments of the disclosure.

Embodiments of the disclosure are described in detail below, examples of which are illustrated in the accompanying drawings, in which the same or similar reference numerals refer to the same or similar elements or elements having the same or similar functions throughout. The embodiments described below with reference to the accompanying drawings are exemplary, intended to explain the disclosure and should not be construed as a limitation of the disclosure.

A method and an apparatus for determining a spatial relationship, a computer device and a storage medium, according to embodiments of the disclosure, are described below with reference to the accompanying drawings.

FIG. 1 is a schematic flowchart of a method for determining a spatial relationship, according to some embodiments of the disclosure.

The embodiments of the disclosure are exemplified in that the method for determining a spatial relationship is configured in an apparatus for determining a spatial relationship. The apparatus for determining a spatial relationship can be applied to any of computer devices, so that the computer device can perform a function for determining a spatial relationship.

The computer devices may be personal computers (PCs), cloud devices, mobile devices or the like. The mobile devices may be hardware devices with various operating systems and touch screens and/or display screens, for example, mobile phones, tablet computers, personal digital assistants, wearable devices, vehicle-mounted devices or the like.

As illustrated in FIG. 1, the method for determining a spatial relationship may include the following steps 101 to 105.

Step 101, a calculation request for the spatial relationship is obtained, in which the calculation request includes a polygonal region and a set of report points.

The spatial relationship may be an inclusion relationship, a nearest neighbor relationship or the like, which is not limited in the disclosure.

In addition, the calculation request for the spatial relationship may include one polygonal region or a plurality of polygonal regions. The calculation request for the spatial relationship may include one set of report points or a plurality of sets of report points.

Alternatively, the calculation request for the spatial relationship may include a target spatial relationship, for example, it may be to determine whether the polygonal region includes report point(s), it may be to determine report point(s) closest to the polygonal region or the like.

Step 102, a plurality of first coded values corresponding to the polygonal region are determined according to a location relationship between each of a plurality of geographic grids and the polygonal region, in which each of the plurality of geographic grids corresponds to one coded value.

There may be various forms for the coded value. The coded value may be generated by any coding manner according to latitude and longitude information corresponding to the geographic grid. For example, the coded value may be generated by using the hash algorithm to code, which is called as the geographic hash value.

In addition, there may be various location relationships between the geographic grids and the polygonal regions. For example, the geographic grid may be completely within the polygonal region, a portion of the geographic grid may be within the polygonal region, the geographic grid may not be within the polygonal region or the like.

In addition, when the location relationship between the geographic grid and the polygonal region is different, the situation of the first coded value corresponding to the polygonal region may also be different.

In the disclosure, any function for calculating a coded value corresponding to an object can be used to determine the plurality of first coded values corresponding to the polygonal region.

In addition, various known coding functions can only calculate coded values corresponding to geographic grids located entirely within the polygonal region. That is, when any geographic grid is completely within the polygonal region, the first coded value corresponding to the polygonal region, obtained by calculation, includes the coded value corresponding to the any geographic grid.

Or, when any geographic grid is not within the polygonal region, the first coded value corresponding to the polygonal region, obtained by calculation, does not include the coded value corresponding to the any geographic grid.

In the disclosure, in order to ensure that the first coded values finally obtained corresponding to the polygonal region are sufficiently comprehensive and complete, the polygonal region may be expanded first, so that the plurality of first coded values finally obtained corresponding to the polygonal region also include coded values corresponding to geographic grids partially within the polygonal region.

Optionally, for any geographic grid whose portion is within the polygonal region, when expanding the polygonal region, 8 geographic grids adjacent to the any geographic grid can be fused, so that the 8 geographic grids adjacent to the any geographic grid are all completely within the expanded polygonal region.

Or, for any geographic grid whose portion is within the polygonal region, vertices of the any geographic grid may be determined first. When expanding the polygonal region, it may move outward along vertices that are not within the polygonal region to extend a certain distance so that the polygonal region is expanded.

It should be noted that the above examples are merely illustrative and may not be used as a limitation for expanding the polygonal region in embodiments of the disclosure.

Step 103, a plurality of second coded values corresponding to the set of report points and a group of report points corresponding to each of the plurality of second coded values, are determined according to a location relationship between each of the plurality of geographic grids and each of the set of report points.

The location relationship between the geographic grid and the report point in the set of report points may be that the geographic grid includes the report point or the geographic grid does not include the report point.

Correspondingly, if the report point is within the geographic grid, it may be determined that the second coded value corresponding to the set of report points includes the coded value corresponding to the geographic grid. If the report point is not within the geographic grid, it may be determined that the second coded value corresponding to the set of report points does not include the coded value corresponding to the geographic grid.

It can be understood that if the report point is on a boundary line of the geographic grid, it can be considered that the report point is within the geographic grid, so that it can be determined that the second coded value corresponding to the set of report points includes the coded value corresponding to the geographic grid.

In addition, the group of report points may include one report point or a plurality of report points.

For example, if the coded value corresponding to geographic grid A is WX1 and report points a, b, c, d and e are all within geographic grid A, it can be determined that one second coded value corresponding to the set of report points is WX1, and the group of report points corresponding to second coded value WX1 may include report points a, b, c, d, e and the like.

It should be noted that the above examples are only illustrative and may not be used as a limitation on the geographic grid and its corresponding coded values, second coded values corresponding to the set of report points, and the group of report points corresponding to the second coded value in some embodiments of the disclosure.

Step 104, a second coded value matching each of the plurality of first coded values is determined by sorting and matching the plurality of first coded values and the plurality of second coded values respectively.

There may be various sorting manners, such as from large to small, from small to large or the like.

For example, each first coded value may be sorted in ascending order and each second coded value may be sorted in ascending order. Afterwards, the sorted smallest first coded value may be compared with the sorted smallest second coded value.

For example, sorting is performed in ascending order, the sorted first coded values are N1, N2 and N3, respectively, and the sorted second coded values are M1, M2 and M3, respectively. Afterwards, the relationship between the smallest first coded value and the smallest second coded value may be compared first. If N1 is smaller than M1, M2 and M3 are both larger than M1, so there is no need to continue to compare the relationship between N1 and M2 and the relationship between N1 and M3, and it can be determined that there is no second coded value in M1, M2 and M3 that is the same as the first coded value N1, reducing the complexity of data processing and improving the efficiency.

Alternatively, the relationship between the smallest first coded value and the smallest second coded value is first compared. If N1 is greater than M1, the relationship between N1 and M2 may continue to be compared. If N1 is smaller than M2, obviously N1 is also smaller than M3, so it can be determined that M1, M2 and M3 do not have the second coded value that is the same as the first coded value N1 without continuing the comparison.

If N1 and M2 are the same, that is, N1 and M2 satisfy the matching condition, after the matching of N1 is completed, the searching for the second coded value matching with N2 may be continued. Since N2 is greater than N1 and N1 and M2 are the same, it can be obtained that N2 is greater than M2. Therefore, when determining the second coded value matching N2, the comparison can be performed directly from M3, thereby effectively reducing the matching time.

It can be seen from the above description that when the number of the first coded values and the second coded values are large, the matching process of each of the first coded values and the second coded values can be performed according to the above process, thereby effectively reducing the matching time and improving the processing efficiency.

It should be noted that the above examples are merely illustrative and may not be used as a limitation on the first coded values, the second coded values, and the matching relationships between the two in embodiments of the disclosure.

Step 105, a relationship between the polygonal region and each report point in the set of report points is determined according to a group of report points corresponding to the second coded value matching each of the plurality of first coded values.

There may be various relationships between the polygonal region and each report point in the set of report points, for example, an inclusion relationship, an exclusion relationship, a nearest neighbor relationship and the like.

It can be understood that when the second coded value matches the first coded value, it indicates that the two correspond to the same map grid, and the group of report points corresponding to the second coded value is also the group of report points corresponding to the first coded value. The first coded value is one of the plurality of first coded values corresponding to the polygonal region and it can be determined that the polygonal region may include the group of report points corresponding to the first coded value.

For example, if the first coded value is WY1, the second coded value matching it is also WY1, and the group of report points corresponding to the second coded value is: report points a, b and c. Correspondingly, the group of report points corresponding to the first coded value is also: report points a, b and c. The first coded value corresponding to the polygonal region includes WY1, so it can be determined that the polygonal region also includes the report points a, b and c corresponding to WY1.

Correspondingly, when the second coded value and the first coded value do not satisfy the matching condition, each group of report points corresponding to the second coded value has no corresponding relationship with the first coded value, and it also has no corresponding relationship with the polygonal region, so it can be determined that the polygonal region does not contain these groups of report points.

It should be noted that, the above examples are only examples and may not be used as the relationship between the polygonal region and each report point in the set of report points in embodiments of the disclosure.

In some embodiments of the disclosure, a calculation request for the spatial relationship is obtained, in which the calculation request includes a polygonal region and a set of report points; a plurality of first coded values corresponding to the polygonal region are determined according to a location relationship between each of a plurality of geographic grids and the polygonal region; a plurality of second coded values corresponding to the set of report points and a group of report points corresponding to each of the plurality of second coded values, are determined according to a location relationship between each of the plurality of geographic grids and each of the set of report points; a second coded value matching each of the plurality of first coded values is determined by sorting and matching the plurality of first coded values and the plurality of second coded values respectively; and a relationship between the polygonal region and each report point in the set of report points is determined according to a group of report points corresponding to the second coded value matching each of the plurality of first coded values. Therefore, the relationship between spatial objects can be quickly determined according to the respective coded value list corresponding to each spatial object, which reduces the time complexity and computational complexity of data processing, greatly reduces the resource overhead, and improves the efficiency.

Figure 2:
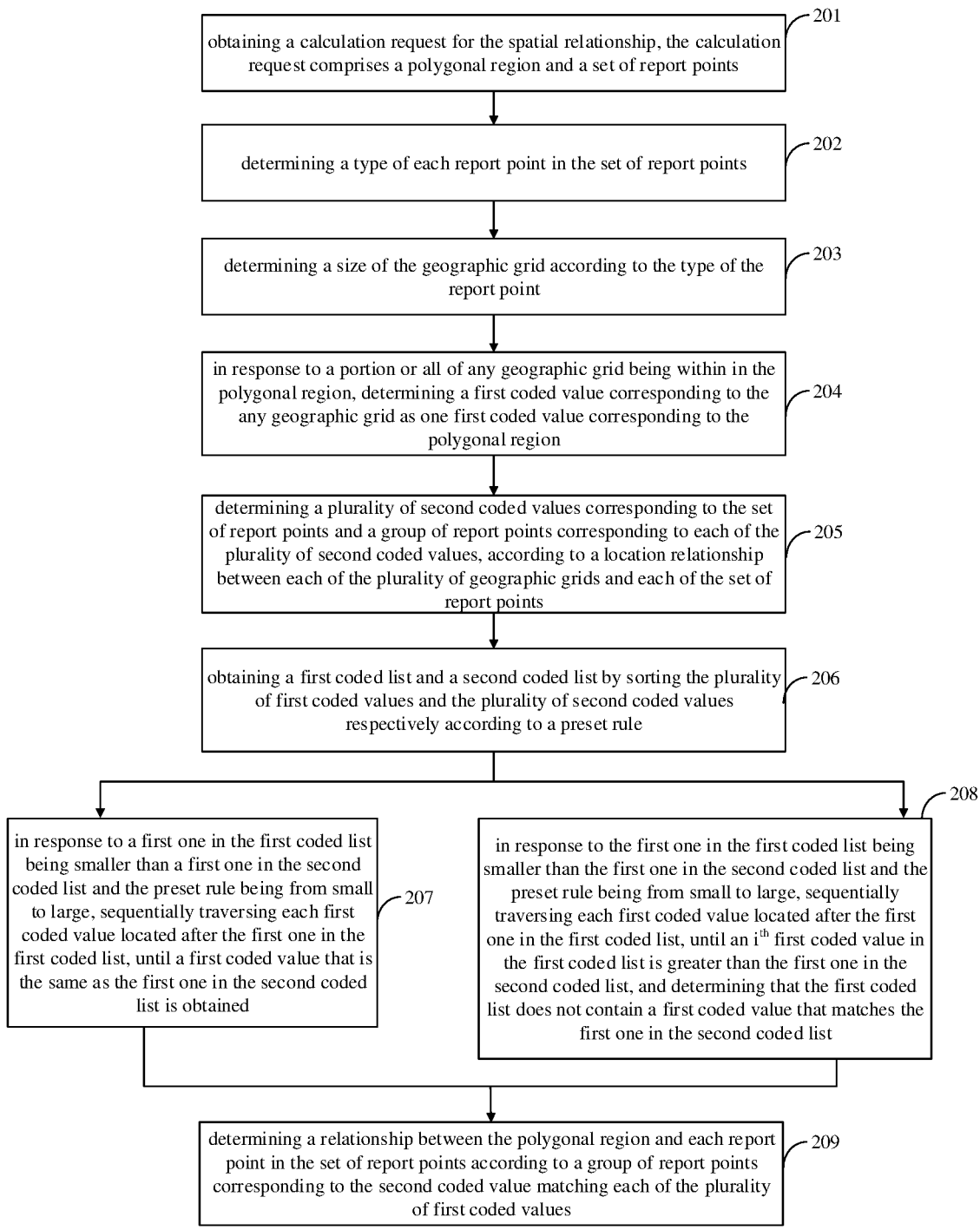
FIG. 2 is a schematic flowchart of a method for determining a spatial relationship, according to other embodiments of the disclosure.

In some implementations, the relationship between spatial objects can be quickly determined according to the respective coded value list corresponding to each spatial object. Further, when sorting and matching the plurality of first coded values and the plurality of second coded values, there may be various situations and the above process will be further described below with reference to steps 201 to 209 in FIG. 2.

Step 201, a calculation request for the spatial relationship is obtained, in which the calculation request includes a polygonal region and a set of report points.

Step 202, a type of each report point in the set of report points is determined.

Step 203, a size of the geographic grid is determined according to the type of the report point.

The type of the report point can be determined according to the generation manner of the report point. For example, if the report point can be generated by positioning a person, its type can be the first type; or if the report point can be generated by positioning a bus stop, its type can be the second type or the like.

It can be understood that, for different types of report points, the corresponding geographic grids may have different sizes, and the geographic grids having different sizes may have different corresponding precision ranges.

For example, if the report point is the first type, and the calculation of the inclusion relationship is the calculation of the case where the report point(s) is included in the polygonal region, the size of the geographic grid can be divided to be a smaller one, so that the determined relationship between the polygonal region and the report point(s) can be more precise.

Alternatively, if the report point is the second type, and the calculation of the nearest neighbor relationship is the calculation of the report point(s) closest to the polygonal region, the size of the geographic grid can be divided to be a relatively larger one, so that it can satisfy service requirements.

For example, when the report point is the first type, it is necessary to calculate the number of people included in the residential polygonal region, and the size of the geographic grid can be divided to be the smaller one. Usually, the boundary range of the residential polygonal region will be larger than 5 m*5 m, the precision corresponding to the 8-bit coded value is 38.2 m*19 m, and the precision range corresponding to the 9-bit coded value is 4.8 m*4.8 m. At this time, in order to make the determined number of people included in the residential polygon region is more accurate, the 9-bit coded value can be selected.

Or, when the report point is the second type and when determining the location of the nearest bus stop near the residential area, it can first estimate the approximate distance between the location of each residential area and the bus stop. For example, it can be 2 km, and the 6-bit coded value can be selected. The 6-bit coded value corresponds to a precision of 1.2 km*609.4 m.

It should be noted that the above examples are merely illustrative and may not be used as a limitation on the type of the report point and determining the size of the geographic grid in embodiments of the disclosure.

Step 204, in response to a portion or all of any geographic grid being within in the polygonal region, a first coded value corresponding to the any geographic grid is determined as one first coded value corresponding to the polygonal region.

For any geographic grid whose partial region is within the polygonal region, the polygonal region may be expanded first, so that the first coded value corresponding to the polygonal region may include the coded value corresponding to the any geographic grid.

In some embodiments of the disclosure, the first coded value corresponding to the polygonal region may include the coded value corresponding to any geographic grid where a portion or all of the region is within the polygonal region, so that the finally obtained first coded values corresponding to the polygonal region are comprehensive and complete.

Step 205, a plurality of second coded values corresponding to the set of report points and a group of report points corresponding to each of the plurality of second coded values, are determined according to a location relationship between each of the plurality of geographic grids and each of the set of report points.

Step 206, a first coded list and a second coded list are determined by sorting the plurality of first coded values and the plurality of second coded values respectively according to a preset rule.

The preset rule may be in ascending order, in descending order or other rules.

For example, each first coded value can be sorted in ascending order, so that the sorted first coded list can be obtained. Correspondingly, each second coded value is also sorted in ascending order, so that the sorted second coded list can be obtained.

Alternatively, each first coded value can be sorted in descending order, so that the sorted first coded list can be obtained. Correspondingly, each second coded value is also sorted in descending order, so that the sorted second coded list can be obtained.

It should be noted that the above examples are merely illustrative and may not be used as a limitation for obtaining the sorted first coded list, second coded list, etc. in embodiments of the disclosure.

Step 207, in response to a first one in the first coded list being smaller than a first one in the second coded list and the preset rule being from small to large, each first coded value located after the first one in the first coded list is sequentially traversed, until a first coded value that is the same as the first one in the second coded list is obtained.

Figure 3:
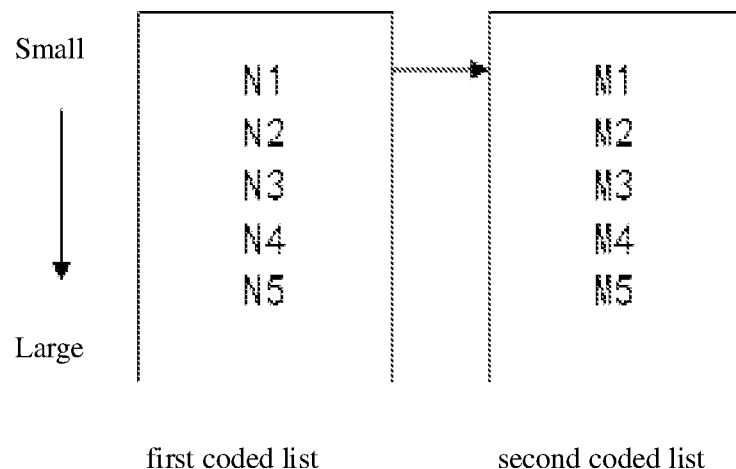
FIG. 3 is a schematic diagram of a first coded list and a second coded list, according to some embodiments of the disclosure.

For example, in the schematic diagram of the first coded list and the second coded list in FIG. 3, the first coded values and the second coded values are sorted in ascending order. Each first coded value in the first coded list is N1, N2, N3, N4, N5 in sequence, and each second coded value in the second coded list is M1, M2, M3, M4, M5 in sequence. If N1 is smaller than M1, it continues to compare the relationship between N2 and M1. If N2 is smaller than M1, it continues to compare the relationship between N3 and M1. If N3 is equal to M1, it can be determined that N3 is the first coded value that is same as M1.

It should be noted that the above examples are merely illustrative and may not be used as a limitation on the first coded value, the second coded value, and the like in embodiments of the disclosure.

In some embodiments, an $i^{th}$ first coded value in the first coded list is the same as a $j^{th}$ second coded value in the second coded list, where i and j are positive integers respectively. An $(i+1)^{th}$ first coded value in the first coded list can be matched with each second coded value located after the $j^{th}$ second coded value in the second coded list to obtain a second coded value matching the $(i+1)^{th}$ second coded value.

For example, in the schematic diagram in FIG. 3, if N2 and M3 are the same, because N3 is greater than N2, obviously N3 is also greater than M3, M2, and M1, the relationship between N3 and M4 can be directly compared, and there is no need for N3 to match with M3, M2, and M1 in sequence, which reduces the complexity of data processing, saves computing resources, and greatly improves the efficiency.

Afterwards, if N3 is less than M4, the relationship between N3 and M5 can be continued to be compared, and if N3 and M5 are the same, it can be determined that the second coded value matching N3 is M5.

It should be noted that the above examples are merely illustrative and may not be used as a limitation on the first coded value, the second coded value, and the matching relationship between the two in embodiments of the disclosure.

Step 208, in response to the first one in the first coded list being smaller than the first one in the second coded list and the preset rule being from small to large, each first coded value located after the first one in the first coded list is sequentially traversed, until an $i^{th}$ first coded value in the first coded list is greater than the first one in the second coded list, and it is determined that the first coded list does not contain a first coded value that matches the first one in the second coded list.

For example, in the schematic diagram in FIG. 3, if N1 is smaller than M1, the relationship between N2 and M1 can be continued to be compared, and if N2 is smaller than M1, the relationship between N3 and M1 can be continued to be compared. If N3 is greater than M1, because each first coded value in the first coded list is sorted in ascending order, obviously N4 and N5 are also greater than M1. There is no need to compare M1 with N4 and N5 respectively, and it can be determined that the first coded list does not contain the first coded value same as M1, thereby reducing the process of data processing, reducing the complexity of data processing, and improving the efficiency of data processing.

It should be noted that the above examples are merely illustrative and may not be used as a limitation on the first coded values in the first coded list, the second coded values in the second coded list, and the matching relationship in embodiments of the disclosure.

Step 209, a relationship between the polygonal region and each report point in the set of report points is determined according to a group of report points corresponding to the second coded value matching each of the plurality of first coded values.

A group of report points corresponding to each of the plurality of first coded values may be determined first according to the group of report points corresponding to the second coded value matching each of the plurality of first coded values.

It can be understood that when the second coded value matches the first coded value, the group of report points corresponding to the second coded value is also the group of report points corresponding to the first coded value.

In addition, for different target spatial relationships, the relationships to be determined between the polygonal region and each report point in the set of report points may also be different.

For example, in response to the target spatial relationship being an inclusion relationship, the repeated report point(s) in respective groups of report points is removed and then the respective groups of report points are merged, so as to generate a set of report points contained in the polygonal region.

For each report point located at the boundary of the geographic grid, statistics may be carried out in multiple geographic grids, so that different groups of report points may contain the same report point, so the repeated report point in each group of report points can be first removed. For example, group 1 of report points and group 2 of report points both contain the same report point a, it may select to keep report point a in group 1 of report points and remove report point a in group 2 of report points.

It can be understood that the polygonal region corresponds to the plurality of first coded values, and the group of report points corresponding to each first coded value is a part of the set of report points corresponding to the polygonal region. The group of report points corresponding to each first coded value has determined, the repeated report point in the group of report points corresponding to each first coded value can be removed earlier, and then each report point in each group of report points is merged to obtain the set of report points contained in the polygonal region.

For example, the polygonal region contains three first coded values, and the groups of report points corresponding to the first coded values are respectively: group 1 of report points, group 2 of report points and group 3 of report points. Group 1 of report points and group 2 of report points both contain the same report point a, report point a in group 1 of report points can be retained, report point a in group 2 of report points can be removed, and then each report point in group 1 of report points, group 2 of report points and group 3 of report points are merged, and the merged result is the set of report points contained in the polygonal region.

It should be noted that the above examples are merely illustrative and may not be used as a limitation on the set of report points included in the polygonal region in embodiments of the disclosure.

Or, in response to the target spatial relationship being a nearest neighbor relationship, a distance between each of the plurality of geographic grids and each report point in a corresponding group of report points is determined, and a nearest report point to the polygonal region is determined according to the distance between each of the plurality of geographic grids and each report point in the corresponding group of report points.

For example, if the target spatial relationship is the nearest neighbor relationship and the report points in the group of report points corresponding to geographic grid 1 are a1, b1 and c1, the distances between geographic grid 1 and report points a1, b1 and c1 can be determined first respectively. The report points in the group of report points corresponding to geographic grid 2 are a2, b2 and c2. The distances between geographic grid 1 and report points a2, b2 and c2 can be determined respectively. Each distance value is sorted. The report point with the smallest value is the report point closest to the polygonal region.

It should be noted that the above examples are merely illustrative and may not be used as a limitation for determining the report point closest to the polygonal region in embodiments of the disclosure.

In some embodiments of the disclosure, a calculation request for the spatial relationship is obtained; a size of the geographic grid is determined according to the type of the report point; first coded values and second coded values are determined according to a location relationship between each of a plurality of geographic grids and the polygonal region and a location relationship between each of the plurality of geographic grids and each of the set of report points; a first coded list and a second coded list are determined by sorting the plurality of first coded values and the plurality of second coded values respectively according to a preset rule; a matching relationship between each first coded value in the first coded list and each second coded value in the second coded list is determined, and a relationship between the polygonal region and each report point in the set of report points is determined. Therefore, the relationship between spatial objects can be quickly determined according to the respective coded value list corresponding to each spatial object, which reduces the time complexity and computational complexity of data processing, greatly reduces the resource overhead, and improves the efficiency.

In some embodiments, the disclosure also provides an apparatus for determining a spatial relationship.

Figure 4:
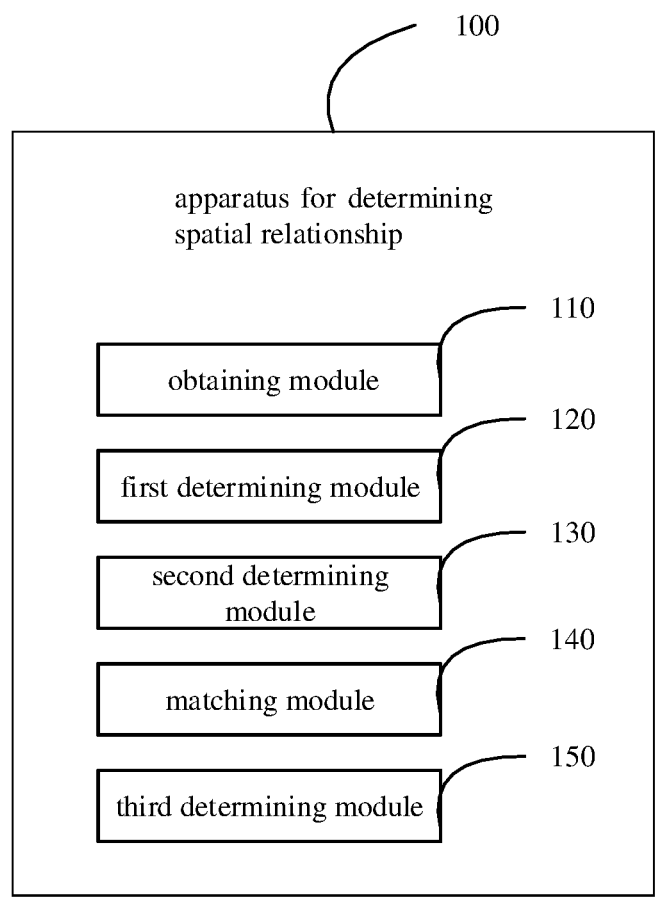
FIG. 4 is a schematic block diagram of an apparatus for determining a spatial relationship, according to some embodiments of the disclosure.

FIG. 4 is a schematic block diagram of an apparatus for determining a spatial relationship, according to some embodiments of the disclosure.

As illustrated in FIG. 4, the apparatus 100 for determining a spatial relationship may include an obtaining module 110, a first determining module 120, a second determining module 130, a matching module 140 and a third determining module 150.

The obtaining module 110 is configured to obtain a calculation request for the spatial relationship, the calculation request includes a polygonal region and a set of report points.

The first determining module 120 is configured to determine a plurality of first coded values corresponding to the polygonal region according to a location relationship between each of a plurality of geographic grids and the polygonal region, in which each of the plurality of geographic grids corresponds to one coded value.

The second determining module 130 is configured to determine a plurality of second coded values corresponding to the set of report points and a group of report points corresponding to each of the plurality of second coded values, according to a location relationship between each of the plurality of geographic grids and each of the set of report points.

The matching module 140 is configured to determine a second coded value matching each of the plurality of first coded values by sorting and matching the plurality of first coded values and the plurality of second coded values respectively.

The third determining module 150 is configured to determine a relationship between the polygonal region and each report point in the set of report points according to a group of report points corresponding to the second coded value matching each of the plurality of first coded values.

For functions and specific implementation principles of the foregoing modules in the embodiments of the disclosure, reference may be made to the foregoing method embodiments, and details are not described herein again.

According to the apparatus for determining a spatial relationship in embodiments of the disclosure, a calculation request for the spatial relationship is obtained, in which the calculation request includes a polygonal region and a set of report points; a plurality of first coded values corresponding to the polygonal region are determined according to a location relationship between each of a plurality of geographic grids and the polygonal region; a plurality of second coded values corresponding to the set of report points and a group of report points corresponding to each of the plurality of second coded values, are determined according to a location relationship between each of the plurality of geographic grids and each of the set of report points; a second coded value matching each of the plurality of first coded values is determined by sorting and matching the plurality of first coded values and the plurality of second coded values respectively; and a relationship between the polygonal region and each report point in the set of report points is determined according to a group of report points corresponding to the second coded value matching each of the plurality of first coded values. Therefore, the relationship between spatial objects can be quickly determined according to the respective coded value list corresponding to each spatial object, which reduces the time complexity and computational complexity of data processing, greatly reduces the resource overhead, and improves the efficiency.

Figure 5:
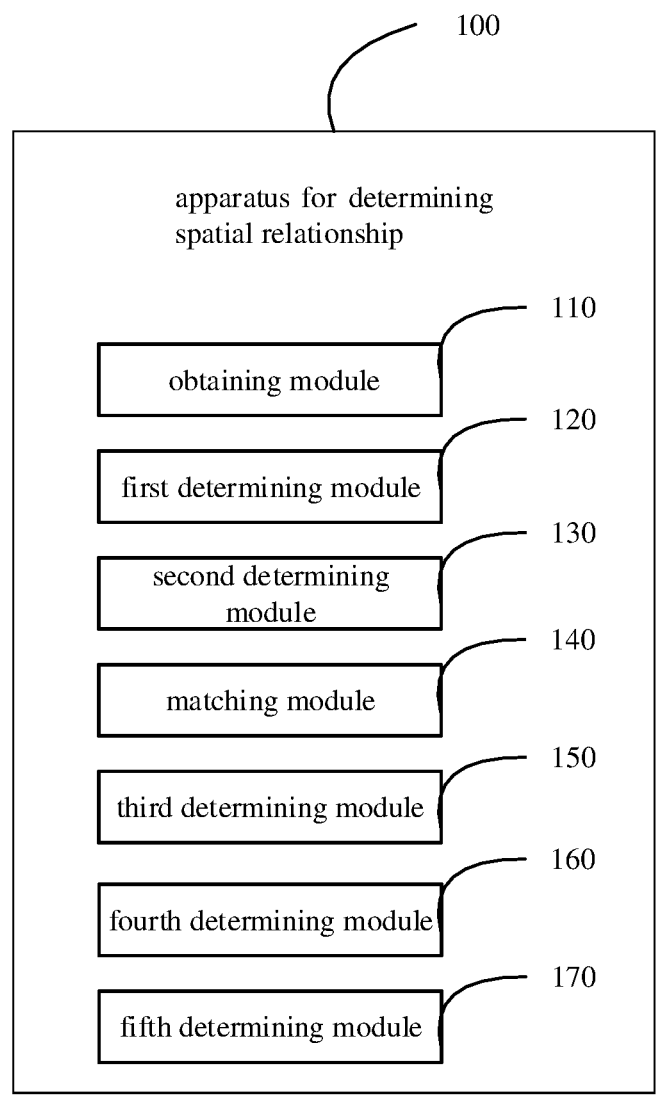
FIG. 5 is a schematic block diagram of an apparatus for determining a spatial relationship, according to other embodiments of the disclosure.

Further, in embodiments of the disclosure, referring to FIG. 5, on the basis of the embodiments in FIG. 4, the above-mentioned apparatus 100 may further include a fourth determining module 160 and a fifth determining module 170.

The fourth determining module 160 is configured to determine a type of each report point in the set of report points.

The fifth determining module 170 is configured to determine a size of the geographic grid according to the type of the report point.

In some embodiments of the disclosure, the first determining module 120 is further configured to: in response to a portion or all of any geographic grid being within in the polygonal region, determine a first coded value corresponding to the any geographic grid as one first coded value corresponding to the polygonal region.

In some embodiments of the disclosure, the matching module 140 is further configured to: obtain a first coded list and a second coded list by sorting the plurality of first coded values and the plurality of second coded values respectively according to a preset rule; and in response to a first one in the first coded list being smaller than a first one in the second coded list and the preset rule being from small to large, sequentially traverse each first coded value located after the first one in the first coded list, until a first coded value that is the same as the first one in the second coded list is obtained.

In some embodiments of the disclosure, the matching module 140 is further configured to: in response to the first one in the first coded list being smaller than the first one in the second coded list and the preset rule being from small to large, sequentially traverse each first coded value located after the first one in the first coded list, until an $i^{th}$ first coded value in the first coded list is greater than the first one in the second coded list, and determine that the first coded list does not contain a first coded value that matches the first one in the second coded list.

In some embodiments of the disclosure, an $i^{th}$ first coded value in the first coded list is the same as a $j^{th}$ second coded value in the second coded list, where i and j are respectively positive integer, and the matching module 140 is further configured to: match an $(i+1)^{th}$ first coded value in the first coded list with each second coded value located after the $j^{th}$ second coded value in the second coded list to obtain a second coded value matching the $(i+1)^{th}$ second coded value.

In some embodiments of the disclosure, the calculation request further includes a target spatial relationship, and the third determining module 150 is further configured to: determine a group of report points corresponding to each of the plurality of first coded values according to the group of report points corresponding to the second coded value matching each of the plurality of first coded values; and in response to the target spatial relationship being an inclusion relationship, remove repeated report points in respective groups of report points and then merge the respective groups of report points to generate a set of report points contained in the polygonal region.

In some embodiments of the disclosure, the third determining module 150 is further configured to: in response to the target spatial relationship being a nearest neighbor relationship, determine a distance between each of the plurality of geographic grids and each report point in a corresponding group of report points; and determine a nearest report point to the polygonal region according to the distance between each of the plurality of geographic grids and each report point in the corresponding group of report points.

For functions and specific implementation principles of the foregoing modules in the embodiments of the disclosure, reference may be made to the foregoing method embodiments, and details are not described herein again.

According to the apparatus for determining a spatial relationship in embodiments of the disclosure, a calculation request for the spatial relationship is obtained; a size of the geographic grid is determined according to the type of the report point; first coded values and second coded values are determined according to a location relationship between each of a plurality of geographic grids and the polygonal region and a location relationship between each of the plurality of geographic grids and each of the set of report points; a first coded list and a second coded list are determined by sorting the plurality of first coded values and the plurality of second coded values respectively according to a preset rule; a matching relationship between each first coded value in the first coded list and each second coded value in the second coded list is determined, and a relationship between the polygonal region and each report point in the set of report points is determined. Therefore, the relationship between spatial objects can be quickly determined according to the respective coded value list corresponding to each spatial object, which reduces the time complexity and computational complexity of data processing, greatly reduces the resource overhead, and improves the efficiency.

In some embodiments, the disclosure provides a computer device. The device includes a memory, a processor and a computer program stored in the memory and running on the processor; when the processor executes the program, the method for determining a spatial relationship proposed in the embodiments of the disclosure is performed.

In some embodiments, the disclosure provides a non-transitory computer-readable storage medium that stores a computer program, and when the computer program is executed by a processor, the method for determining a spatial relationship proposed in the embodiments of the disclosure is performed.

In some embodiments, the disclosure provides a computer program product. When an instruction in the computer program product is executed by a processor, the method for determining a spatial relationship proposed in the embodiments of the disclosure is performed.

Figure 6:
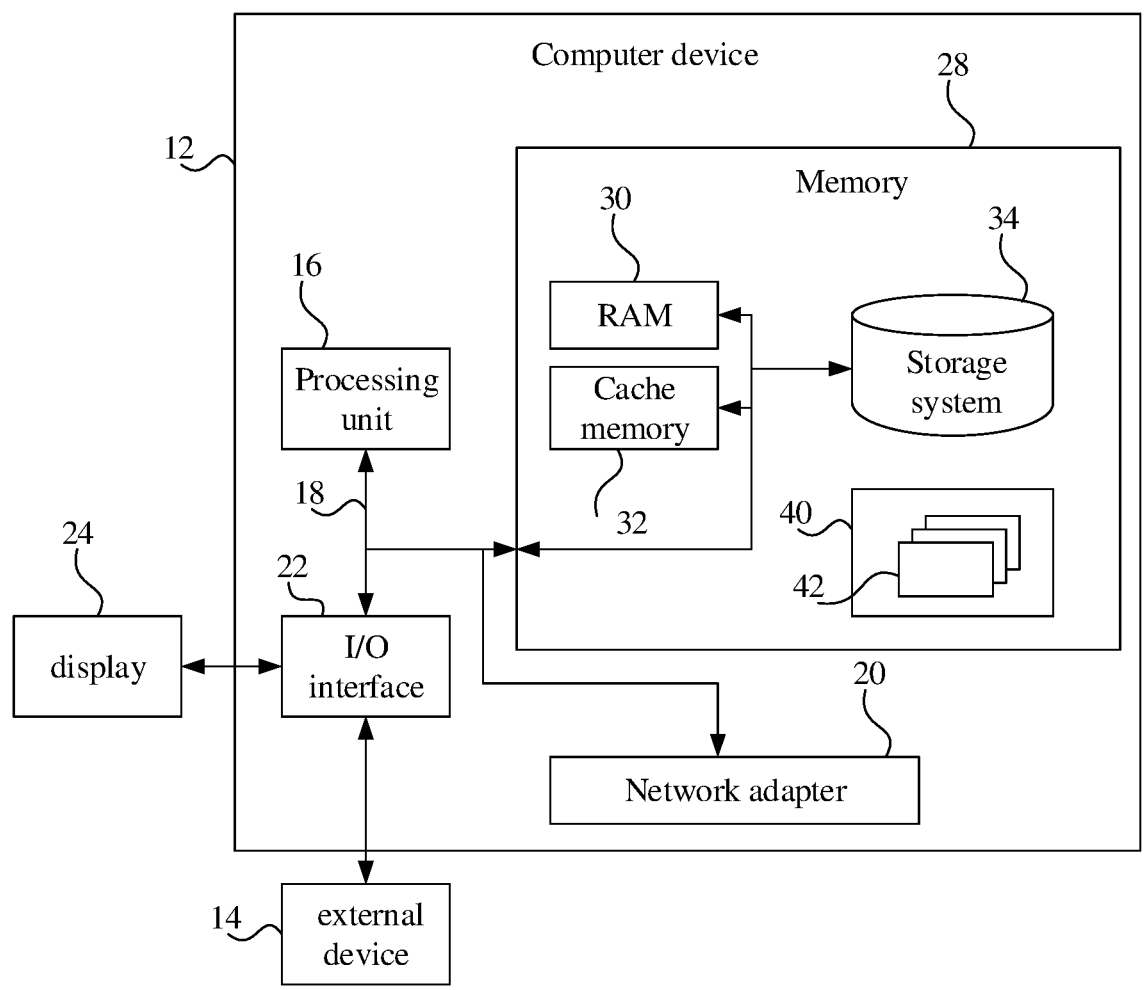
FIG. 6 is a block diagram of an exemplary computer device suitable for implementing embodiments of the disclosure.

FIG. 6 is a block diagram of an exemplary computer device suitable for implementing embodiments of the disclosure. The computer device 12 in FIG. 6 is only an example, and should not impose any limitation on the function and scope of use of the embodiments of the disclosure.

As illustrated in FIG. 6, the computer device 12 may be represented via a general computer device form. The computer device 12 may include but not be limited to the following components: one or more processors or processing units 16, a system memory 28 and a bus 18 connecting various system components (including the system memory 28 and the processing unit 16).

The bus 18 represents one or more of several types of bus structures, including a memory bus or a memory controller, a peripheral bus, a graphics acceleration port, a processor or a local bus using any of a variety of bus structures. For example, these structures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 12 typically includes a variety of computer system readable media. These media may be any available media accessible by the computer device 12 and includes both volatile and non-volatile media, removable and non-removable media.

The memory 28 may include a computer system readable medium in the form of volatile memory, such as a random access memory (hereinafter referred to as RAM) 30 and/or a high speed cache memory 32. The computer device 12 may further include other removable or non-removable, volatile or non-volatile computer system storage media. By way of example only, the storage system 34 may be configured to read and write a non-removable and non-volatile magnetic media (not illustrated in FIG. 6, commonly referred to as a "hard drive"). Although not illustrated in FIG. 6, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 18 via one or more data medium interfaces. The memory 28 may include at least one program product.

The program product has a set (such as, at least one) of program modules configured to perform the functions of various embodiments of the disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods of the embodiments described in the disclosure.

The computer device 12 may also communicate with one or more external devices 14 (such as, a keyboard, a pointing device, a display 24, etc.). Furthermore, the computer device 12 may also communicate with one or more communication devices enabling a user to interact with the computer device 12 and/or other devices (such as a network card, modem, etc.) enabling the computer device 12 to communicate with one or more computer devices. This communication can be performed via the input/output (I/O) interface 22. Also, the computer device 12 may communicate with one or more networks (such as a local area network (hereafter referred to as LAN), a wide area network (hereafter referred to as WAN) and/or a public network such as an Internet) through a network adapter 20. As illustrated in FIG. 6, the network adapter 20 communicates with other modules of the computer device 12 over the bus 18. It should be understood that, although not illustrated in FIG. 6, other hardware and/or software modules may be used in connection with the computer device 12. The hardware and/or software includes, but is not limited to, microcode, device drivers, redundant processing units, external disk drive arrays, RAID systems, tap Drive and data backup storage system.

The processing unit 16 is configured to execute various functional applications and data processing by running programs stored in the system memory 28, for example, implementing the method as described in the above embodiments.

In the solutions of the disclosure, a calculation request for the spatial relationship is obtained, in which the calculation request includes a polygonal region and a set of report points; a plurality of first coded values corresponding to the polygonal region are determined according to a location relationship between each of a plurality of geographic grids and the polygonal region; a plurality of second coded values corresponding to the set of report points and a group of report points corresponding to each of the plurality of second coded values, are determined according to a location relationship between each of the plurality of geographic grids and each of the set of report points; a second coded value matching each of the plurality of first coded values is determined by sorting and matching the plurality of first coded values and the plurality of second coded values respectively; and a relationship between the polygonal region and each report point in the set of report points is determined according to a group of report points corresponding to the second coded value matching each of the plurality of first coded values. Therefore, the relationship between spatial objects can be quickly determined according to the respective coded value list corresponding to each spatial object, which reduces the time complexity and computational complexity of data processing, greatly reduces the resource overhead, and improves the efficiency.

In the description of the disclosure, reference throughout this specification to "an embodiment," "some embodiments," "an example," "a specific example," or "some examples," means that a particular feature, structure, material, or characteristic described in connection with the embodiment or example is included in at least one embodiment or example of the disclosure. The appearances of the phrases in various places throughout this specification are not necessarily referring to the same embodiment or example of the disclosure. Furthermore, the particular features, structures, materials, or characteristics may be combined in any suitable manner in one or more embodiments or examples. In addition, without a contradiction, the different embodiments or examples and the features of the different embodiments or examples can be combined by a person skilled in the art.

In addition, the description of "first", "second" is only for description purpose, it cannot be understood as indicating or implying its relative importance or implying the number of indicated technology features. Thus, features defined as "first", "second" may explicitly or implicitly include at least one of the features. In the description of the disclosure, "a plurality of" means at least two, such as two, three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the disclosure includes other implementations, which should be understood by a person skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

A person skilled in the art shall understand that all or parts of the steps in the above exemplifying method of the disclosure may be achieved by commanding the related hardware with programs. The programs may be stored in a computer readable storage medium, and the programs comprise one or a combination of the steps in the method embodiments of the disclosure when run on a computer.

In addition, each function cell of the embodiments of the disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by a person skilled in the art that the above embodiments are exemplary and cannot be construed to limit the disclosure, and changes, modifications, alternatives and varieties can be made in the embodiments by a person skilled in the art without departing from scope of the disclosure.

What is claimed is:

1. A method for determining a spatial relationship, comprising:
   receiving, by a computing device, a request for determining a location of a nearest bus stop near a residential area;
   obtaining, by the computing device, a calculation request for the spatial relationship, the calculation request comprising a polygonal region and a set of report points;
   determining, by the computing device, a plurality of first coded values corresponding to the polygonal region according to a location relationship between each of a plurality of geographic grids and the polygonal region, wherein each of the plurality of geographic grids corresponds to one coded value;
   determining, by the computing device, a plurality of second coded values corresponding to the set of report points and a group of report points corresponding to each of the plurality of second coded values, according to a location relationship between each of the plurality of geographic grids and each of the set of report points, wherein each of the report points is generated by positioning a bus stop;
   determining, by the computing device, a second coded value matching each of the plurality of first coded values by sorting and matching the plurality of first coded values and the plurality of second coded values respectively; and
   determining, by the computing device, a relationship between the polygonal region and each report point in the set of report points according to a group of report points corresponding to the second coded value matching each of the plurality of first coded values, wherein the calculation request further includes a target spatial relationship, and the determining of the relationship between the polygonal region and each report point in the set of report points comprises:

determining, by the computing device, a group of report points corresponding to each of the plurality of first coded values according to the group of report points corresponding to the second coded value matching each of the plurality of first coded values;

in response to the target spatial relationship being a nearest neighbor relationship, determining, by the computing device, a distance between each of the plurality of geographic grids and each report point in a corresponding group of report points;

determining, by the computing device, a nearest report point to the polygonal region according to the distance between each of the plurality of geographic grids and each report point in the corresponding group of report points; and outputting, by the computing device, the nearest report point to enable a user to determine the location of the nearest bus stop near the residential area and go to the location of the nearest bus stop to take a bus.

2. The method according to claim 1, further comprising:
determining a type of each report point in the set of report points; and
determining a size of the geographic grid according to the type of the report point.

3. The method according to claim 1, wherein determining the plurality of first coded values corresponding to the polygonal region according to the location relationship between each of the plurality of geographic grids and the polygonal region comprises:

in response to a portion or all of any geographic grid being within in the polygonal region, determining a first coded value corresponding to the any geographic grid as one first coded value corresponding to the polygonal region.

4. The method according to claim 1, wherein determining the second coded value matching each of the plurality of first coded values by sorting and matching the plurality of first coded values and the plurality of second coded values respectively comprises:

obtaining a first coded list and a second coded list by sorting the plurality of first coded values and the plurality of second coded values respectively according to a preset rule; and in response to a first one in the first coded list being smaller than a first one in the second coded list and the preset rule being from small to large, sequentially traversing each first coded value located after the first one in the first coded list, until a first coded value that is the same as the first one in the second coded list is obtained.

5. The method according to claim 4, further comprising:
in response to the first one in the first coded list being smaller than the first one in the second coded list and the preset rule being from small to large, sequentially traversing each first coded value located after the first one in the first coded list, until an $i^{th}$ first coded value in the first coded list is greater than the first one in the second coded list, and determining that the first coded list does not contain a first coded value that matches the first one in the second coded list.

6. The method according to claim 4, wherein an $i^{th}$ first coded value in the first coded list is the same as a $j^{th}$ second coded value in the second coded list, where i and j are respectively positive integer, and the method further comprises:

matching an (i+1)th first coded value in the first coded list with each second coded value located after the $j^{th}$ second coded value in the second coded list to obtain a second coded value matching the (i+1)th second coded value.

7. A computing device comprising a memory for storing a computer program, and a processor, configured to perform:

receiving a request for determining a location of a nearest bus stop near a residential area;

obtaining a calculation request for the spatial relationship, the calculation request comprising a polygonal region and a set of report points;

determining a plurality of first coded values corresponding to the polygonal region according to a location relationship between each of a plurality of geographic grids and the polygonal region, wherein each of the plurality of geographic grids corresponds to one coded value;

determining a plurality of second coded values corresponding to the set of report points and a group of report points corresponding to each of the plurality of second coded values, according to a location relationship between each of the plurality of geographic grids and each of the set of report points, wherein each of the report points is generated by positioning a bus stop;

determining a second coded value matching each of the plurality of first coded values by sorting and matching the plurality of first coded values and the plurality of second coded values respectively; and determining a relationship between the polygonal region and each report point in the set of report points according to a group of report points corresponding to the second coded value matching each of the plurality of first coded values, wherein the calculation request further includes a target spatial relationship, and the determining of the relationship between the polygonal region and each report point in the set of report points comprises:

determining a group of report points corresponding to each of the plurality of first coded values according to the group of report points corresponding to the second coded value matching each of the plurality of first coded values;

in response to the target spatial relationship being a nearest neighbor relationship, determining a distance between each of the plurality of geographic grids and each report point in a corresponding group of report points;

determining a nearest report point to the polygonal region according to the distance between each of the plurality of geographic grids and each report point in the corresponding group of report points; and outputting the nearest report point to enable a user to determine the location of the nearest bus stop near the residential area and go to the location of the nearest bus stop to take a bus.

8. The device according to claim 7, wherein the processor is configured to perform:

determining a type of each report point in the set of report points; and determining a size of the geographic grid according to the type of the report point.

9. The device according to claim 7, wherein the processor is configured to perform:
in response to a portion or all of any geographic grid being within in the polygonal region, determining a first coded value corresponding to the any geographic grid as one first coded value corresponding to the polygonal region.

10. The device according to claim 7, wherein the processor is configured to perform:
obtaining a first coded list and a second coded list by sorting the plurality of first coded values and the plurality of second coded values respectively according to a preset rule; and
in response to a first one in the first coded list being smaller than a first one in the second coded list and the preset rule being from small to large, sequentially traversing each first coded value located after the first one in the first coded list, until a first coded value that is the same as the first one in the second coded list is obtained.

11. The device according to claim 10, wherein the processor is configured to perform:
in response to the first one in the first coded list being smaller than the first one in the second coded list and the preset rule being from small to large, sequentially traversing each first coded value located after the first one in the first coded list, until an $i^{th}$ first coded value in the first coded list is greater than the first one in the second coded list, and determining that the first coded list does not contain a first coded value that matches the first one in the second coded list.

12. The device according to claim 10, wherein the processor is configured to perform:
matching an (i+1)th first coded value in the first coded list with each second coded value located after a $j^{th}$ second coded value in the second coded list to obtain a second coded value matching the (i+1)th second coded value.

13. A non-transitory computer-readable storage medium storing a computer program, wherein the computer program performs a method when executed by a processor of a computing device, the method comprising:
receiving a request for determining a location of a nearest bus stop near a residential area;
obtaining a calculation request for the spatial relationship, the calculation request comprising a polygonal region and a set of report points;
determining a plurality of first coded values corresponding to the polygonal region according to a location relationship between each of a plurality of geographic grids and the polygonal region, wherein each of the plurality of geographic grids corresponds to one coded value;
determining a plurality of second coded values corresponding to the set of report points and a group of report points corresponding to each of the plurality of second coded values, according to a location relationship between each of the plurality of geographic grids and each of the set of report points, wherein each of the report points is generated by positioning a bus stop;
determining a second coded value matching each of the plurality of first coded values by sorting and matching the plurality of first coded values and the plurality of second coded values respectively; and
determining a relationship between the polygonal region and each report point in the set of report points according to a group of report points corresponding to the second coded value matching each of the plurality of first coded values, wherein
the calculation request further includes a target spatial relationship, and
the determining of the relationship between the polygonal region and each report point in the set of report points comprises:
determining a group of report points corresponding to each of the plurality of first coded values according to the group of report points corresponding to the second coded value matching each of the plurality of first coded values;
in response to the target spatial relationship being a nearest neighbor relationship, determining a distance between each of the plurality of geographic grids and each report point in a corresponding group of report points;
determining a nearest report point to the polygonal region according to the distance between each of the plurality of geographic grids and each report point in the corresponding group of report points; and
outputting the nearest report point to enable a user to determine the location of the nearest bus stop near the residential area and go to the location of the nearest bus stop to take a bus.

14. The non-transitory computer-readable storage medium according to claim 13, wherein the method further comprises:
determining a type of each report point in the set of report points; and
determining a size of the geographic grid according to the type of the report point.

15. The non-transitory computer-readable storage medium according to claim 13, wherein determining the plurality of first coded values corresponding to the polygonal region according to the location relationship between each of the plurality of geographic grids and the polygonal region comprises:
in response to a portion or all of any geographic grid being within in the polygonal region, determining a first coded value corresponding to the any geographic grid as one first coded value corresponding to the polygonal region.

16. The non-transitory computer-readable storage medium according to claim 13, wherein determining the second coded value matching each of the plurality of first coded values by sorting and matching the plurality of first coded values and the plurality of second coded values respectively comprises:
obtaining a first coded list and a second coded list by sorting the plurality of first coded values and the plurality of second coded values respectively according to a preset rule; and
in response to a first one in the first coded list being smaller than a first one in the second coded list and the preset rule being from small to large, sequentially traversing each first coded value located after the first one in the first coded list, until a first coded value that is the same as the first one in the second coded list is obtained.

* * * * *